Feb. 9, 1954 W. L. HURFORD 2,668,883

AMPLIFIER FOR ATTENUATING THE HIGHER FREQUENCY COMPONENTS OF SIGNALS

Filed June 10, 1950

Inventor:
Winslow L. Hurford,
by Merton D. Morse
His Attorney.

Patented Feb. 9, 1954

2,668,883

UNITED STATES PATENT OFFICE 2,668,883

AMPLIFIER FOR ATTENUATING THE HIGHER FREQUENCY COMPONENTS OF SIGNALS

Winslow L. Hurford, North Syracuse, N. Y., assignor to General Electric Company, a corporation of New York Application June 10, 1950, Serial No. 167,441

7 Claims. (Cl. 179—171)

Figure 1:
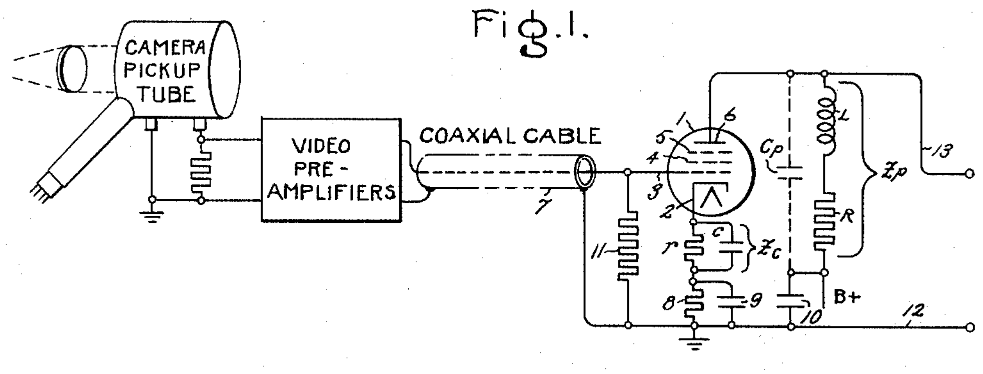

The present invention relates in general to amplifiers and in particular, relates to compensation amplifiers in which compensation for attenuation of the higher frequency components of a signal is achieved without introducing appreciable phase shift in the compensation operation.

Compensation amplifiers find extensive use in television video systems where it is desired to transmit signals, having frequencies extending over a wide range. A particular application of the amplifier would be at the terminal end of a long coaxial cable connecting a television camera situated at one location in a studio with a control monitor situated at another location in the studio. A coaxial cable causes an attenuation of the higher frequency components of the video signal without introducing any phase shift in these higher frequency components. Accordingly, in order to compensate for the attenuation introduced by the cable it is necessary to amplify the higher frequency components of the video signal, which are attenuated more than the lower frequency components of the video signal, without introducing phase shift in the operation.

Various circuit arrangements exist in the prior art for compensating for the attenuation of the higher frequency components of signals introduced by such means as coaxial cables. However, these arrangements introduce appreciable detrimental phase shift along with the desired amplitude compensation. One such arrangement comprises by-passing the cathode resistor of an amplifier with a capacitor having the desired characteristic to reduce the cathode degeneration of the amplifier at the higher frequencies. Another such arrangement comprises introducing a series peaking inductance in series with the plate load resistor of an amplifier to decrease the plate loading at higher frequencies; thus higher gain is obtained from the amplifier at the higher frequencies; and accordingly, a boost in the amplitude of the higher frequency components in the signal being amplified is obtained. Both these arrangements individually introduce an appreciable phase shift which is undesired along with the desired amplitude boost in the higher frequency components.

Accordingly it is a principal object of my invention to provide amplifier means for compensating for frequency attenuation without at the same time introducing appreciable phase shift.

An important object of my invention is to provide an amplifier having a rising gain characteristic with frequency without introducing appreciable phase shift with frequency.

A general object of my invention is to provide improvements in electronic amplifiers.

In an amplifier embodying my invention a rising gain characteristic without appreciable phase shift is achieved by providing a parallel combination of resistance and capacitance in the cathode circuit of the amplifier and a series combination of inductance and resistance as the load in the amplifier. These components of resistance, inductance and capacitance are so apportioned with respect to the inherent capacitance existing at the output of the amplifier that a rising gain characteristic is obtained while at the same time the phase shift introduced by the cathode degenerative circuit compensates for the phase shift introduced by the anode peaking circuit.

Figure 2:
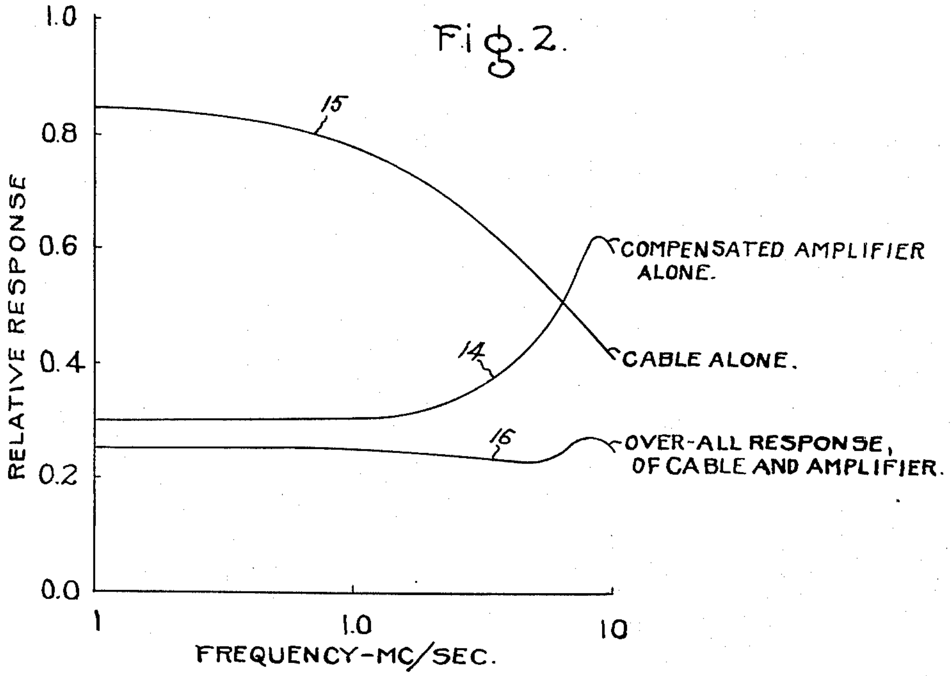

The novel features which I believe to be characteristic of my invention are set forth with particularity in the appended claims. My invention itself, however, both as to its organization and method of operation, together with further objects and advantages thereof may best be understood by the following description taken in connection with the accompanying drawings in which Fig. 1 shows a schematic diagram of a circuit embodying my invention; Fig. 2 shows curves of relative response versus frequency for a cable alone, for a compensated amplifier alone and for the cable and amplifier together.

Referring now with particularity to Fig. 1, there is shown an amplifier embodying my invention. The function performed by the amplifier is to compensate for the amplitude attenuation in a coaxial cable. It will be understood that my invetnion is not limited to the compensation of attenuation in coaxial cables but has broader applications and uses. In a television studio the camera pickup tube is usually located at a considerable distance from the camera control monitor and console which contains control circuits and switches for televising a program. Consequently, it is necessary to transmit video signals from the camera pickup tube to the camera control monitor and console through a long length of coaxial cable. The long length of coaxial cable introduces appreciable attenuation of the higher frequency components of the video signal without introducing any phase distortion. Accordingly, in order to obtain a video signal at the console and the camera control monitor which is a faithful reproduction of the signal picked up at the camera pickup tube it is necessary to compensate for the attenuation of the higher frequencies introduced by the coaxial cable. Therefore a compensation amplifier is located at the camera control monitor and console. The amplifier preferably comprises a multi-grid electron discharge device of the pentode variety. However, triodes and tetrodes may be used as well. The electron discharge device 1 shown in the figure comprises a cathode 2, a control grid 3, a screen grid 4, a suppressor grid 5 and an anode 6. The video signal from the coaxial cable 7 is fed into the grid 3 of the electron discharge device 1. A cathode resistance $r$ shunted by a capacitor $c$ is connected between the cathode 2 and ground. Collectively the impedance of the parallel combination of $r$ and $c$ is denoted by $Z_c$. The capacitor $c$ at the higher frequencies reduces the degenerative effect of cathode resistor $r$.

A second parallel combination of resistance 8 and capacity 9 may be connected in series with the first combination of resistance $r$ and capacity $c$ and ground in order to introduce more bias than introduced by the first parallel combination. The second capacitor 9 may be made large in order to supply the desired bias without causing significant degeneration. A series combination of inductance L and resistance R is connected between the plate 6 of the electron discharge device 1 and a source of B+ potential. This impedance effectively shunts the inherent capacity $C_p$ existing between the plate or anode 6 and ground. The load impedance comprising L, R and $C_p$ is denoted $Z_p$. The capacitor 10 is a filter or decoupling capacitor. Grid resistance 11 is connected between grid and ground. The output from the electron discharge device is taken between conductors 12 and 13. The values of L and R are so chosen with respect to $C_p$ and the parallel combination of resistance $r$ and capacity $c$ in the cathode circuit of the electron discharge device so that the desired rising amplitude characteristic with frequency is obtained without the introduction of phase shift with frequency.

An appreciation that the detrimental phase shift introduced by a cathode compensation circuit and the detrimental phase shift introduced by an anode compensation circuit can be made to compensate for each other and consequently produce a characteristic that is rising with frequency but with inappreciable phase shift will be apparent from a consideration of the following mathematical analysis. Using complex notation:

$$Z_c=\frac{r-j\omega cr^2}{1+r^2\omega^2c^2} \qquad (1)$$

where $\omega=2\pi\cdot$frequency $$Z_p=\frac{\left[\frac{RL}{C_p}-\frac{R}{\omega C_p}\left(\omega L-\frac{1}{\omega C_p}\right)\right]-j\left[\frac{R^2}{\omega C_p}+\frac{\omega L^2}{C_p}-\frac{L}{\omega C_p{}^2}\right]}{R^2+\left(\omega L-\frac{1}{\omega C_p}\right)^2} \qquad (2)$$

$$E_{gk}=E-Z_ci_p \qquad (3)$$

where $E_{gk}$ is the instantaneous voltage between grid and cathode, where E is the instantaneous voltage between grid and ground, and where $i_p$ is the plate current of the discharge device 1.

$$i_p=E_{gk}g_m \qquad (4)$$

where $g_m$ is the transconductance of the electron discharge device. By substituting Equation 4 in Equation 3 the following relationship is obtained.

$$E_{gk}=E-Z_cE_{gk}g_m \qquad (5)$$

or $$E_{gk}=\frac{E}{1+Z_cg_m}=\frac{E}{1+g_m|Z_c|\angle\theta} \qquad (6)$$

where $\theta$ is the phase angle of the impedance $Z_c$.

$$E_{pgnd}=i_pZ_p=E_{gk}g_mZ_p \qquad (7)$$

where $E_{pgnd}$ is the instantaneous voltage from anode to ground. By substituting Equation 6 in Equation 7 the following relationship is obtained:

$$E_{pgnd}=\frac{E}{1+g_m|Z_c|\angle\theta}(g_mZ_p) \qquad (8)$$

The ratio of output to input voltage is $$\frac{E_{pgnd}}{E}=\frac{g_mZ_p}{1+g_mZ_c\angle\theta}=\frac{g_m|Z_p|\angle\phi}{1+g_m|Z_c|\angle\theta} \qquad (9)$$

where $\phi$ is the phase angle of impedance $Z_p$.

The phase angle of $Z_c$, $\theta$, is negative and hence the phase angle of the denominator of Equation 9 is also negative. It may also be noted from Equation 2 that $Z_p$ has a negative phase angle when L is small, as it usually is when used for shunt peaking.

Equation 9 is then of the general form:

$$\frac{E_{pgnd}}{E}=\frac{A\angle-\alpha}{B\angle-\beta} \qquad (10)$$

where A, B, $\alpha$ and $\beta$ are positive numbers. Equation 10 then becomes $$\frac{E_{pgnd}}{E}=\left|\frac{A}{B}\right|\angle\beta-\alpha=Z\angle\zeta \qquad (11)$$

where Z denotes $$\left|\frac{A}{B}\right|$$

and $\zeta$ denotes $\beta-\alpha$ thus the angle $\zeta$ is less than either the angle $\alpha$ associated with the shunt peaking, or the angle $\beta$ associated with the degenerative circuit in the cathode. Thus this circuit will provide an amplification characteristic which increases with increasing frequency at the same time produces less phase shift than that which would be obtained with either the shunt peaked or cathode degeneration circuit alone.

In order to show that the phase angles introduced by a degeneration circuit connected to the cathode of an electron discharge device and a shunt peaking circuit connected to the anode of electron discharge device add if no consideration is taken of the inherent or stray capacity between the anode of the amplifier and ground consider the foregoing derivations with $Z_p$ now represented by $R+j\omega L$. Equation 10 then assumes the form $$\frac{E_{pgnd}}{E}=\frac{A\angle+\alpha}{B\angle-\beta}=\left|\frac{A}{B}\right|\angle\alpha+\beta \qquad (12)$$

where $\alpha$ is positive since the phase angle of impedance $Z_p$ is now positive.

Note that in this case the two phase angles add together so that the total phase angle is greater than for either circuit alone. If, however, in the first case mathematically analyzed above where the shunt capacity is considered and R is made greater than $$\frac{L}{C_p}$$

then the phase angle of the numerator will be negative and the total phase angle will be the difference of the two phase angles rather than the sum. When the entire circuit, including a stray capacity is considered, the analytical solution for an expression for the phase shift becomes quite complex.

The desired characteristic, in an amplifier of the kind under consideration, is a Z in Equation 11 which increases with increasing frequency, and a phase angle $\zeta$ which varies from zero by the smallest possible amount. Z cannot increase indefinitely with increasing frequency, nor can $\zeta$ remain exactly at zero. The upper frequency limit is reached at the parallel resonant frequency of the plate circuit. Beyond this point the magnitude Z drops rapidly and phase angle $\zeta$ increases rapidly. It has been found that for values of $\omega$ less than $\omega_0$, where $\omega_0^2$ equals $$\frac{1}{LC_p}$$

the desired characteristics may be obtained if $$\sqrt{\frac{1}{LC_p}}=\frac{R}{L} \tag{13}$$

and $$\frac{R}{L} \text{ is of the order of } \frac{1}{rc} \tag{14}$$

The relationship (14) is not too critical and the actual values may be modified by considerations of the point where a rising frequency characteristic should begin to be apparent. Frequently this means that $$\frac{1}{rc} \text{ is less than } \frac{R}{L}$$

While my invention is not limited to particular circuit parameters the following circuit parameters have been found quite satisfactory for a particular application:

Electron discharge device, Type 6AQ5
$C_p$=25 micromicrofarads
$r$=200 ohms
$C$=240 micromicrofarads
$L$=12.5 microhenrys
$R$=750 ohms.

$$\sqrt{\frac{1}{LC_p}}=56.6\times10^6.$$

$$\frac{1}{rc}=20.8\times10^6.$$

$$\frac{R}{L}=60\times10^6.$$

From the above tabulation it is seen that the condition of Equation 13 is met and that $$\frac{1}{rc}$$

is about one-third that required for equality with $$\frac{R}{L}$$

With a circuit having the above parameters a compensated amplifier characteristic such as shown in curve 14 of Fig. 2 was obtained with a maximum phase shift of about 19.4 degrees. Curve 15 shows the attenuation characteristic of a particular cable with which the amplifier was used. Curve 16 shows the overall response of cable and amplifier.

To meet any specified rising characteristic the relationship between the upper frequency limit, $\omega_0$, and the top frequency to be considered, $\omega$, will have to be adjusted. If less of a rising characteristic is desired $\omega_0$ should be much greater than $\omega$; if more of a rising characteristic is desired then $\omega_0$ and $\omega$ will be more nearly equal. The case where $\omega_0=\omega$ represents the maximum rising characteristic obtainable with any given cathode circuit. For a greater gain increase the cathode degeneration may be increased by increasing $r$ and returning the grid to a positive potential so that proper bias is maintained. The relationships given represent a first approximation to a solution. Detailed calculations of the phase shift and attenuation characteristics in accordance with the foregoing derivations will indicate which components should have their values changed so as to obtain the desired frequency phase characteristic.

While I have shown a particular embodiment of my invention, it will of course be understood that I do not wish to be limited thereto since many modifications, both in the circuit arrangement and in the instrumentalities employed, may be made, and I therefore contemplate by the appended claims to cover any such modifications as fall within the true spirit and scope of my invention.

What I claim and desire to secure by Letters Patent of the United States is:

1. An amplifier comprising an electron discharge device having an anode, a grid, and a cathode, an impedance comprising a parallel combination of resistance and capacitance connected between said cathode and a point of reference potential, an input circuit connected between said grid and cathode through said impedance, means for biasing said grid with respect to said cathode, another impedance including an inductance and resistance in series and having one end thereof connected to said anode, a source of direct voltage having its negative terminal connected to said point of reference potential and its positive terminal connected to said other end of said series combination, said second resistance and inductance have such values with respect to the capacitance between said anode and said point of reference potential and with respect to said first resistance and first capacitance that when a signal voltage having a range of frequencies is applied to said input circuit the voltage between said anode and said point of reference potential increases with increase in frequency over said range and the phase of said latter voltage with respect to the phase of said signal voltage is substantially constant throughout said range.

2. A signal amplifier for amplifying a wide band of frequencies, comprising an electron discharge device having a cathode, a grid and an anode, an impedance including a parallel combination of resistance and capacitance having one end thereof connected to the cathode of said electron discharge device and the other end thereof connected to a point of reference potential, means for biasing said grid with respect to said cathode, a second impedance having one end thereof connected to said anode and including a series combination of resistance and inductance, a source of direct voltage having its negative terminal connected to said point of reference potential and its positive terminal connected to the other end of said series combination, means for applying a signal between said grid and said point of reference potential, the magnitudes of said first resistance and first capacitance being selected to provide with said second impedance and the inherent plate capacitance a rising gain characteristic with increase in frequency while at the same time cancelling in effect any phase shift introduced by said anode circuit.

3. An amplifying system comprising a source of signal having a decreasing amplitude characteristic with increase in frequency, an amplifier including an electron discharge device having a cathode, a grid and an anode, an impedance including a parallel combination of resistance and capacitance having one end thereof connected to said cathode and the other end thereof connected to a point of reference potential, inherent capacitance existing between said anode and the other end of said impedance, means for biasing said grid with respect to said cathode, a second impedance including a series combination of inductance and resistance, one terminal of said series combination being connected to said anode, one terminal of said signal source connected to said control grid and the other terminal connected to the end of said parallel combination of resistance and capacitance remote from the cathode of said amplifier, a source of direct voltage having its negative terminal connected to said point of reference potential and its positive terminal connected to the end of said series combination of resistance and inductance remote from the anode of said amplifier, the values of the circuit elements of said impedances and said inherent capacitance arranged so that the phase shifts caused by each of said circuits in signal transmission in said amplifier substantially cancel each other.

4. In combination, a transmission line having a falling amplitude characteristic with increase in frequency, means for compensating for said falling amplitude characteristic comprising an electron discharge device having an anode, a control electrode and a cathode, an impedance comprising a parallel combination of resistance and capacitance connected between said cathode and a point of reference potential, means for biasing said grid with respect to said cathode, one end of said transmission line connected between said grid and said point of reference potential, inherent capacitance existing between said anode and said point of reference potential, an output circuit connected between said anode, said point of reference potential, said output circuit including an inductance and resistance in series, one end of said series combination being connected to said anode, a source of direct voltage having its negative terminal connected to said point of reference potential and its positive terminal connected to the other end of said series combination, said second resistance and inductance have such values with respect to said inherent capacitance and with respect to said first resistance and capacitance that when a signal voltage having a range of frequencies is applied to the other end of said transmission line the voltage between said anode and said point of reference potential remains substantially constant with increase in frequencies over said range and the phase of said latter voltage with respect to the phase of said signal voltage is substantially constant throughout said range.

5. An amplifier comprising an electron discharge device having an anode, a control grid and a cathode, an impedance comprising a parallel combination of resistance and capcitance connected between said cathode and a point of reference potential, an input circuit connected between said grid and cathode through said impedance, means for biasing said grid with respect to said cathode, an output circuit connected between said anode and cathode through said impedance, said output circuit including an inductance and a second resistance in series, one end of said series combination being connected to said anode and a source of direct voltage having its negative terminal connected to said point of reference potential and its positive terminal connected to said other end of said series combination, inherent capacitance existing between said anode and said point of reference potential and being in shunt with said series combination of resistance and inductance, said second resistance and inductance having such values that the frequency of operation of said amplifier is less than the natural parallel resonant frequency of said inductance and second capacitance combination, said second resistance, second capacitance and inductance further related by the expression $$\sqrt{\frac{1}{LC_p}}=\frac{R}{L}$$

where L is said inductance, $C_p$ is said second inductance, and R is said second resistance and having such values with respect to said first resistance and said capacitance that when a signal voltage having a range of frequencies is applied to said input circuit the voltage between said anode and said point of reference potential increases with increase in frequency over said range and the phase of said latter voltage with respect to the phase of said signal voltage is substantially constant throughout said range.

6. An amplifier comprising an electron discharge device having an anode, a control electrode and a cathode, an impedance comprising a parallel combination of resistance and capacitance connected between said cathode and a point of reference potential, an input circuit connected between said grid and cathode through said impedance, means for biasing said grid with respect to said cathode, an output circuit connected between said anode and cathode through said impedance, said output circuit including an inductance and resistance in series, one end of said series combination being connected to said anode, means for applying energization to said device between said point of reference potential and the other end of said series combination, inherent capacitance existing between said anode and said point of reference potential and being in shunt with said series combination of resistance and inductance, said second resistance, second capacitance and inductance further related by the expression $$\sqrt{\frac{1}{LC_p}}=\frac{R}{L}$$

where L is said inductance, $C_p$ is said second capacitance, and R is said second resistance and having such values with respect to said first resistance and said first capacitance that when a signal voltage having a range of frequencies is applied to said input circuit the voltage between said anode and said point of reference potential increases with increase in frequency over said range and the phase of said latter voltage with respect to the phase of said signal voltage is substantially constant throughout said range.

7. An amplifier comprising an electron discharge device having an anode, a control electrode and a cathode, an impedance comprising a parallel combination of resistance and capacitance connected between said cathode and a point of reference potential, an input circuit connected between said grid and cathode through said impedance, an output circuit connected between said anode and cathode through said impedance, said output circuit including an inductance and resistance in series, one end of said series combination being connected to said anode and a source of direct voltage having its negative terminal connected to said point of reference potential and its positive terminal connected to said other end of said series combination, inherent capacitance existing between said anode and said point of reference potential and being in shunt with said series combination of resistance and inductance, said second resistance and inductance having such values that the frequency of operation of said amplifier is less than the natural parallel resonant frequency of said inductance and second capacitance combination, said first and second resistances, said first and second capacitances and inductance further related by the expressions $$\sqrt{\frac{1}{LC_p}}=\frac{R}{L}$$

and $$\frac{1}{rc}<\frac{R}{L}$$

where L is said inductance, $C_p$ is said capacitance, R is said second resistance, $r$ is said first resistance, and $c$ is said first capacitance, whereby when a signal voltage having a range of frequencies is applied to said input circuit the voltage between said anode and said point of reference potential increases with increase in frequency over said range and the phase of said latter voltage with respect to the phase of said signal voltage is substantially constant throughout said range.

WINSLOW L. HURFORD.

References Cited in the file of this patent

UNITED STATES PATENTS

| Number | Name | Date |
|---|---|---|
| 2,032,914 | Crossley et al. | Mar. 3, 1936 |
| 2,173,232 | Landon | Sept. 19, 1939 |
| 2,227,604 | Smith | Jan. 7, 1941 |
| 2,269,654 | Foster | Jan. 13, 1942 |
| 2,269,694 | Schade | Jan. 13, 1942 |
| 2,584,332 | Crooker et al. | Feb. 5, 1952 |